(12) United States Patent
Mueller

(10) Patent No.: US 9,150,726 B2
(45) Date of Patent: Oct. 6, 2015

(54) HEAT-STABILIZED SILICONE MIXTURE

(71) Applicant: Wacker Chemie AG, Munich (DE)

(72) Inventor: Philipp Mueller, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/371,614

(22) PCT Filed: Jan. 2, 2013

(86) PCT No.: PCT/EP2013/050010
§ 371 (c)(1),
(2) Date: Jul. 10, 2014

(87) PCT Pub. No.: WO2013/104551
PCT Pub. Date: Jul. 18, 2013

(65) Prior Publication Data
US 2015/0045503 A1    Feb. 12, 2015

(30) Foreign Application Priority Data

Jan. 11, 2012    (DE) .................. 10 2012 200 335

(51) Int. Cl.
| | |
|---|---|
| C08L 83/04 | (2006.01) |
| C09D 183/04 | (2006.01) |
| C08K 5/56 | (2006.01) |
| C08J 3/28 | (2006.01) |
| C08G 77/12 | (2006.01) |
| C08G 77/20 | (2006.01) |

(52) U.S. Cl.
CPC . *C08L 83/04* (2013.01); *C08K 5/56* (2013.01); *C09D 183/04* (2013.01); *C08G 77/12* (2013.01); *C08G 77/20* (2013.01); *C08J 3/28* (2013.01)

(58) Field of Classification Search
None
See application file for complete search history.

(56) References Cited

U.S. PATENT DOCUMENTS

| | | | |
|---|---|---|---|
| 6,518,204 B2 * | 2/2003 | Yamakawa et al. | 438/780 |
| 2007/0112147 A1 * | 5/2007 | Morita et al. | 525/478 |
| 2012/0168780 A1 * | 7/2012 | Cha et al. | 257/88 |
| 2014/0291872 A1 * | 10/2014 | Harkness et al. | 257/791 |

FOREIGN PATENT DOCUMENTS

| | | |
|---|---|---|
| MX | 9702803 A1 | 6/1998 |
| WO | 2008138944 A2 | 11/2008 |
| WO | 2011107592 A1 | 9/2011 |

OTHER PUBLICATIONS

Machine-generated translation of JP 09-286919 into English.*

* cited by examiner

*Primary Examiner* — Marc Zimmer
(74) *Attorney, Agent, or Firm* — Brooks Kushman P.C.

(57) ABSTRACT

Curable silicone mixture containing an alkenyl-functional silicone, an Si—H functional silicone, an epoxy-functional silicone, a ferrocene, and a hydrosilylation curing catalyst, provide thermally stable silicones which are also adherent. The compositions are particularly useful for embedding power semiconductor devices.

9 Claims, No Drawings

HEAT-STABILIZED SILICONE MIXTURE

CROSS-REFERENCE TO RELATED APPLICATIONS

This application is the U.S. National Phase of PCT Appln. No. PCT/EP2013/050010 filed Jan. 2, 2013, which claims priority to German application DE 10 2012 200 335.5 filed Jan. 11, 2012, the disclosures of which are incorporated in their entirety by reference herein.

BACKGROUND OF THE INVENTION

1. Field of the Invention

The invention relates to a crosslinkable silicone mixture which contains a ferrocene compound and an alkoxysilane having at least one epoxide group.

2. Description of the Related Art

Electronic components are being operated at ever greater powers and the power density continues to increase as a result of progressive miniaturization. Power electronics in particular requires new materials which withstand a temperature of above 200° C. in the long term and afford long-term protection against environmental influences for the power semiconductors embedded therein and ensure insulation performance. The silicone gels used to date in the field of power modules do not meet this requirement since thermooxidative embrittlement occurs above about 180° C. and allows the gel to harden; in addition, delamination and bubble formation of the embedding gel from the substrate to be protected is observed.

MX 9702803 describes fluorosilicone gels which are heat-stabilized by addition of ferrocene or ferrocene derivatives, so that the mechanical properties are largely maintained under the action of heat.

Fluorosilicone gels which have been heat-stabilized by means of ferrocene or ferrocene derivatives have been described. However, pure heat stability does not suffice for protection of electronic components, i.e. the pure stability of the usually low modulus of the crosslinked silicone is not sufficient to protect the electronics to a satisfactory extent. Rather, the delamination and bubble formation of the embedding mixture which occurs at such high temperatures has to be prevented.

SUMMARY OF THE INVENTION

The invention provides a crosslinkable silicone mixture which contains
(A) polyorganosiloxane containing at least two alkenyl groups per molecule and having a viscosity at 25° C. of from 0.05 to
50 Pa·s,
(B) an organosilicon compound containing at least two SiH functions per molecule,
(C) a catalyst of the platinum group,
(D) a ferrocene compound and
(E) an alkoxysilane having at least one epoxide group.

DETAILED DESCRIPTION OF THE PREFERRED EMBODIMENTS

It has been found that the heat-stabilized silicone gels which are described in MX 9702803 and to which ferrocene has been added lead to detachment of the silicone layer because of lack of adhesion to the substrate to be protected and the protective action and also the insulation performance which has been increased by the silicone layer are lost.

As a result of the addition of the alkoxysilane (E) having at least one epoxide group, the silicone mixture can additionally undergo cohesive bonding to the substrate to be protected. This silicone mixture can cure to give self-adhesive, heat-stable silicone gels or soft silicone elastomers, offers long-term protection and ensures the insulation performance of electronic components.

The composition of the polyorganosiloxane (A) containing alkenyl groups preferably corresponds to the average general formula (1)

$$R^1_x R^2_y SiO_{(4-x-y)/2} \quad (1),$$

where
$R^1$ is a monovalent, unsubstituted or halogen- or cyano-substituted $C_2$-$C_{10}$-hydrocarbon radical which contains aliphatic carbon-carbon multiple bonds and can be bound via an organic divalent group to the silicon atom,
$R^2$ is a monovalent, unsubstituted or halogen- or cyano-substituted $C_1$-$C_{10}$-hydrocarbon radical which is free of aliphatic carbon-carbon multiple bonds,
x is a nonnegative number such that at least two radicals $R^1$ are present in each molecule and
y is a nonnegative number such that (x+y) is in the range from 1.8 to 2.5.

The alkenyl groups $R^1$ can be obtained by means of an addition reaction with an SiH-functional crosslinker, in particular with the organosilicon compound (B). Alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl, are usually used.

Organic divalent groups via which the alkenyl groups $R^1$ can be bound to silicon of the polymer chain consist, for example, of oxyalkylene units such as those of the general formula (2)

$$-(O)_m[(CH_2)_n O]_o- \quad (2),$$

where
m is 0 or 1, in particular 0,
n is from 1 to 4, in particular 1 or 2, and
o is from 1 to 20, in particular from 1 to 5.

The oxyalkylene units of the general formula (10) are bound at the left-hand end to a silicon atom.

The radicals $R^1$ can be bound in any position on the polymer chain, in particular to the terminal silicon atoms.

Examples of unsubstituted radicals R2 are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical; alkenyl radicals such as the vinyl, allyl, n-5-hexenyl, 4-vinylcyclohexyl and the 3-norbornenyl radical; cycloalkyl radicals such as cyclopentyl, cyclohexyl, 4-ethylcyclohexyl, cycloheptyl radicals, norbornyl, and methylcyclohexyl radicals; aryl radicals such as the phenyl, biphenylyl, and naphthyl radicals; alkaryl radicals such as the o-, m-, p-tolyl radicals and ethylphenyl radicals; and aralkyl radicals such as the benzyl radical, and the alpha and the β-phenylethyl radicals.

Examples of substituted hydrocarbon radicals as radicals R2 are halogenated hydrocarbons such as the chloromethyl, 3-chloropropyl, 3-bromopropyl, 3,3,3-trifluoropropyl and 5,5,5,4,4,3,3-hexafluoropentyl radicals and also the chlorophenyl, dichlorophenyl and trifluorotolyl radicals.

$R^2$ preferably has from 1 to 6 carbon atoms.

Particular preference is given to methyl and phenyl.

Constituent (A) can also be a mixture of various polyorganosiloxanes which contain alkenyl groups and differ, for example, in the alkenyl group content, the type of alkenyl group, or structurally.

The structure of the polyorganosiloxanes (A) containing alkenyl groups can be linear, cyclic or branched. The content of trifunctional and/or tetrafunctional units leading to branched polyorganosiloxanes is typically very low, preferably not more than 20 mol %, in particular not more than 0.1 mol %.

Particular preference is given to using polydimethylsiloxanes which contain vinyl groups and whose molecules correspond to the general formula (3)

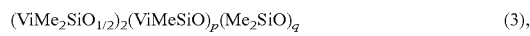

$$(ViMe_2SiO_{1/2})_2(ViMeSiO)_p(Me_2SiO)_q \qquad (3),$$

where the nonnegative integers p and q satisfy the following relationships: $p \geq 0$, $50 < (p+q) < 20{,}000$, preferably $200 < (p+q) < 1000$, and $0 < (p+1)/(p+q) < 0.2$.

The viscosity of the polyorganosiloxane (A) at 25° C. is preferably from 0.1 to 15 Pa·s, in particular from 0.3 to 5 Pa·s.

The content of polyorganosiloxane (A) is preferably selected so that the silicone mixture has a content of compound (A) of 30-99.8% by weight, preferably 50-99.5% by weight, in particular 60-99% by weight.

The organosilicon compound (B) containing at least two SiH functions per molecule preferably has a composition of the average general formula (4)

$$H_a R^3_b SiO_{(4-a-b)/2} \qquad (4),$$

where $R^3$ is a monovalent, unsubstituted or halogen- or cyano-substituted $C_1$-$C_{18}$-hydrocarbon radical which is free of aliphatic carbon-carbon multiple bonds and a and b are nonnegative integers, with the proviso that $0.5 < (a+b) < 3.0$ and $0 < a < 2$ and that at least two silicon-bonded hydrogen atoms are present per molecule.

Examples of $R^3$ are the radicals indicated for $R^2$. $R^3$ preferably has from 1 to 6 carbon atoms. Particular preference is given to methyl and phenyl.

Preference is given to using an organosilicon compound (B) containing three or more SiH bonds per molecule. When using an organosilicon compound (B) having only two SiH bonds per molecule, it is advisable to use a polyorganosiloxane (A) which has at least three alkenyl groups per molecule.

The hydrogen content of the organosilicon compound (B) based exclusively on the hydrogen atoms bound directly to silicon atoms is preferably in the range from 0.002 to 1.7% by weight of hydrogen, preferably from 0.1 to 1.7% by weight of hydrogen.

The organosilicon compound (B) preferably contains at least three and not more than 600 silicon atoms per molecule. Preference is given to using an organosilicon compound (B) containing from 4 to 200 silicon atoms per molecule.

The structure of the organosilicon compound (B) can be linear, branched, cyclic or network-like.

Particularly preferred organosilicon compounds (B) are linear polyorganosiloxanes of the general formula (5)

$$(HR^4_2SiO_{1/2})_c(R^4_3SiO_{1/2})_d(HR^4SiO_{2/2})_e(R^4_2SiO_{2/2})_f \qquad (5),$$

where $R^4$ has the meanings of $R^3$ and the nonnegative integers c, d, e and f satisfy the following relationships: $(c+d)=2$, $(c+e)>2$, $5<(e+f)<200$ and $1<e/(e+f)<0.1$.

The SiH-functional organosilicon compound (B) is preferably present in the crosslinkable silicone composition in such an amount that the molar ratio of SiH groups to alkenyl groups is from 0.1 to 3, in particular from 0.2 to 1.5.

As catalyst (C), it is possible to use all known catalysts of the platinum group which catalyze the hydrosilylation reactions occurring in the crosslinking of addition-crosslinking silicone compositions. The catalyst (C) contains at least one metal or a compound of platinum, rhodium, palladium, ruthenium and iridium, preferably platinum.

Examples of such catalysts (C) are metallic and finely divided platinum which can be present on supports such as silicon dioxide, aluminum oxide or activated carbon, compounds or complexes of platinum, for example platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$, and cyclohexanone, platinum-vinylsiloxane complexes, in particular platinum-divinyltetramethyldisiloxane complexes with or without a content of detectable inorganically bound halogen, bis (gamma-picoline)platinum dichloride, trimethylenedipyridineplatinum dichloride, dicyclopentadieneplatinum dichloride, (dimethyl sulfoxide)ethyleneplatinum(II) dichloride and also reaction products of platinum tetrachloride with olefin and primary amine or secondary amine or primary and secondary amine, for example the reaction product of platinum tetrachloride dissolved in 1-octene with sec-butylamine, or ammonium-platinum complexes.

A particularly preferred catalyst (C) is the KARSTEDT catalyst, i.e. a Pt(0) complex, in particular the platinum(0)-1, 3-divinyl-1,1,3,3-tetramethyldisiloxane complex of the formula $Pt_2[[(CH_2=CH)(CH_3)_2Si]_2O]_3$.

In a preferred embodiment, the catalysts (C) can be activated by means of light having a wavelength of from 200 to 500 nm.

Particularly suitable light-activatable catalysts (C) are cyclopentadienyl complexes of platinum, preferably of the general formula (6)

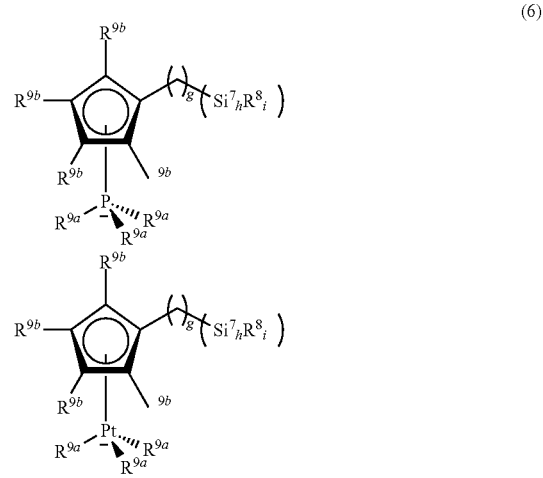

where g=1 to 8, h=0 to 2,
i=1 to 3,
the radicals $R^7$ are, independently of one another, identical or different and are each a monovalent, unsubstituted or substituted, linear, cyclic or branched hydrocarbon radical which contains aliphatically saturated or unsaturated or aromatically unsaturated radicals and has from 1 to 30 carbon atoms and in which individual carbon atoms can be replaced by O, N, S or P atoms,
the radicals $R^8$ are each, independently of one another, identical or different hydrolyzable functional groups selected from the group consisting of
carboxy —O—C(O)$R^{10}$,
oxime —O—N=$CR^{10}_2$,
alkoxy —O$R^{10}$,
alkenyloxy —O—$R^{12}$,
amide —N$R^{10}$—C(O)$R^{11}$,
amine —N$R^1$O$R^{11}$,
aminoxy —O—N$R^1$O$R^{11}$, where
 the radicals $R^{10}$ are, independently of one another, identical or different and are each H, alkyl, aryl, arylalkyl, alkylaryl,
 the radicals $R^{11}$ are, independently of one another, identical or different and are each alkyl, aryl, arylalkyl, alkylaryl,
 the radicals $R^{12}$ are each a linear or branched, aliphatically unsaturated organic radical,
the radicals $R^{9a}$ are, independently of one another, identical or different and are each alkyl, aryl, arylalkyl, alkylaryl having from 1 to 30 carbon atoms, where the hydrogens may be replaced by -Hal or —Si$R^9_3$, where
 the radicals $R^9$ are, independently of one another, identical or different and are each a monovalent, unsubstituted or substituted, linear, cyclic or branched hydrocarbon radical,
the radicals $R^{9b}$ are, independently of one another, identical or different and are each hydrogen or a monovalent, unsubstituted or substituted, linear or branched hydrocarbon radical which contains aliphatically saturated or unsaturated or aromatically unsaturated radicals and has from 1 to 30 carbon atoms and in which individual carbon atoms can be replaced by O, N, S or P atoms and which can form rings fused to the cyclopentadienyl radical.

Preferred radicals $R^7$ are linear saturated hydrocarbon radicals having from 1 to 8 carbon atoms. Preference is also given to the phenyl radical.

Preferred radicals $R^8$ are methoxy, ethoxy, acetoxy and 2-methoxyethoxy groups.

Preferred radicals $R^{9a}$ are linear and branched, optionally substituted alkyl radicals such as methyl, ethyl, propyl or butyl radicals.

Preferred radicals $R^{9b}$ are linear and branched, optionally substituted linear alkyl radicals such as methyl, ethyl, propyl or butyl radicals. Preference is also given to optionally further-substituted fused rings such as the indenyl or fluorenyl radical, for example.

A particularly preferred catalyst (C) is MeCp(PtMe$_3$).

The catalyst (C) can be used in any desired form, for example also in the form of microcapsules containing hydrosilylation catalyst, or organopolysiloxane particles.

The content of hydrosilylation catalysts (C) is preferably selected so that the silicone mixture has a content of metal of the platinum group of 0.1-200 ppm by weight, preferably 0.5-40 ppm by weight.

The silicone mixture is preferably transparent and free of light-absorbing fillers.

Preferred ferrocene compounds (D) are ferrocene ((di(cyclopentadienyl)iron), acetylferrocene, vinylferrocene, ethynyl ferrocene, ferrocenylmethanol, tetrachloroferrate(III), bis(η-cyclopentadienyl)iron(III), tetracarbonylbis(η-cyclopentadienyl)diiron(I), 1,1'-bis(trimethylsilyl)ferrocene, 1,1'-(dimethylphenoxysilyl)ferrocene and 1,1'-bis(dimethylethoxy-silyl)ferrocene. Particular preference is given to ferrocene and acetylferrocene. The ferrocene compound (D) can also be a mixture of various ferrocene compounds (D).

The content of ferrocene compound (D) is preferably selected so that the silicone mixture has a content of ferrocene compound (D) of 1-5000 ppm by weight, preferably 10-1000 ppm by weight.

The alkoxysilane (E) having at least one epoxide group preferably has the general formula 7

$$R^{13}_u R^{14}_v Si(OR^{15})_{4-u-v} \qquad (7),$$

where
 $R^{13}$ is an unsubstituted or halogen-substituted monovalent hydrocarbon radical having from 1 to 10 carbon atoms,
 $R^{14}$ is a monovalent hydrocarbon radical which contains at least one epoxy group and has from 2 to 20 carbon atoms and which may be halogen-substituted and interrupted by O, N, S or P atoms,
 $R^{15}$ is an alkyl radical having 1-6 carbon atoms,
 u is 0, 1 or 2 and
 v is 1, 2 or 3,
with the proviso that the sum of u and v is less than or equal to 3.

Examples and preferred examples of the radicals $R^{13}$ and $R^{15}$ have been indicated above in the case of the radical $R^2$.

Particularly preferred radicals $R^{13}$ are the methyl, ethyl, vinyl and phenyl radicals.

Particularly preferred radicals $R^{15}$ are methyl, ethyl, propyl and butyl radicals.

Examples of radicals $R^{14}$ are the epoxyethyl, 2,3-epoxypropyl, 3,4-epoxybutyl, 5,6-epoxyhexyl, 9,10-epoxydecyl, glycidyloxy, 3-glycidyloxypropyl, glycidyloxyisobutyl, 2-methylglycidyloxypropyl, 3-phenylglycidyloxypropyl, glycidyloxyphenylnonyl, glycidyloxybenzylethyl, 3,4-epoxycyclohexyl, 2-(3,4-epoxycyclohexyl)ethyl, 3-(3,4-epoxycyclohexyl)propyl, 1,4-epoxycyclohexyl and 2-(1,4-epoxycyclohexyl)ethyl radicals. Preferred radicals $R^{14}$ are the 3,4-epoxycyclohexyl, 3-(3,4-epoxycyclohexyl)propyl and glycidoxypropyl radicals. The radical $R^{14}$ preferably has from 2 to 10 carbon atoms. The radical $R^{14}$ is preferably an alkyl radical. The particularly preferred radical $R^{14}$ is the glycidoxypropyl radical.

As alkoxysilane (E) having an epoxide group, particular preference is given to glycidyloxypropyltrimethoxysilane (Glymo).

The content of alkoxysilane (E) having an epoxy group is preferably selected so that the silicone mixture has a content of compound (E) of 0.01-5% by weight, preferably 0.1-2% by weight, in particular 0.2-1% by weight.

The silicone mixture can also contain filler (F). Examples of nonreinforcing fillers (F) are fillers having a BET surface area of up to 50 m²/g, e.g. quartz, diatomaceous earth, calcium silicate, zirconium silicate, zeolites, metal oxide powders such as aluminum, titanium, iron or zinc oxides or mixed oxides thereof, barium sulfate, calcium carbonate, gypsum, silicon nitride, silicon carbide, boron nitride, glass and polymer powders. Reinforcing fillers, i.e. fillers having a BET surface area of at least 50 m²/g, are, for example, pyrogenic silica, precipitated silica, carbon blacks such as furnace black and acetylene black and silicon-aluminum mixed oxides having a large BET surface area. Fibrous fillers are, for example, asbestos and also polymer fibers. The fillers mentioned can have been hydrophobicized, for example by treatment with organosilanes or organosiloxanes or by etherification of hydroxyl groups to form alkoxy groups. It is possible to use one type of filler, but it is also possible to use a mixture of at least two fillers.

When the silicone mixtures contain filler (F), the proportion of the latter is preferably from 2 to 60% by weight, in particular from 5 to 50% by weight.

The silicone mixtures can contain an H-terminated linear polyorganosiloxane as constituent (G). The polyorganosiloxane (G) is preferably an H-dimethylsiloxy-terminated dimethylpolysiloxane of the formula $HSi(CH_3)_2—[O—Si(CH_3)_2]_w—H$, where w is from 1 to 1000.

The viscosity of the polyorganosiloxane (G) at 25° C. is preferably from 0.1 to 10 Pa·s, in particular from 0.5 to 3 Pa·s. When the silicone mixtures contain H-terminated linear polyorganosiloxane (G), the proportion of the latter is preferably from 2 to 70% by weight, in particular from 5 to 50% by weight.

The silicone mixtures can contain further additives as constituent (H) in a proportion of up to 70% by weight, preferably from 0.0001 to 40% by weight. These additives can be, for example, resin-like polyorganosiloxanes which differ from the organopolysiloxanes (A) and (B), dispersants, solvents, bonding agents, pigments, dyes, plasticizers, organic polymers, heat stabilizers, etc. These include additives such as dyes, pigments, etc. Furthermore, thixotropic constituents such as finely divided silica or other commercially available thixotropic additives can be present as constituent (H).

It is also possible for additives (H) which serve to specifically set the processing time, start temperature and crosslinking rate of the silicone mixture to be present. These inhibitors and stabilizers are very well known in the field of crosslinking compositions.

In addition, it is also possible to add additives which improve the compression set. In addition, hollow bodies can also be added. In addition, blowing agents for producing foams can also be added. In addition, polydiorganosiloxanes which are not vinyl-functionalized can also be added.

Compounding of the silicone mixture is effected by mixing the abovementioned constituents (A) to (H) in any order. The constituents (A) to (H) of the silicone mixture can be compounded to form 2 components or only 1 component.

The silicone mixture can crosslink at a temperature as low as 20° C. after mixing of the individual constituents or is irradiated with light having a wavelength of from 200 to 500 nm or is preferably heated in order to cure it to form moldings. The temperature is preferably at least 60° C., more preferably at least 90° C., and in particular at least 120° C., and preferably not more than 250° C., more preferably not more than 200° C., and in particular not more than 160° C.

The silicone mixture preferably has a viscosity at 25° C. of from 0.1 to 15 Pa·s, in particular from 0.3 to 5 Pa·s.

Owing to the heat stability and the self-adhesion produced at the same time by bonding additives (E), the silicone mixtures are particularly suitable for embedding of power electronics operated at high temperatures, e.g. power modules or hybrid electronics.

The invention also provides silicone moldings which are obtainable by a process in which a silicone mixture containing
(A) polyorganosiloxane containing at least two alkenyl groups per molecule and having a viscosity at 25° C. of from 0.05 to 50 Pa·s,
(B) an organosilicon compound containing at least two SiH functions per molecule,
(C) a catalyst of the platinum group,
(D) a ferrocene compound and
(E) an alkoxysilane having at least one epoxide group is heated to at least 80° C.

The invention also provides silicone moldings which are obtainable by a process in which a silicone mixture containing
(A) polyorganosiloxane containing at least two alkenyl groups per molecule and having a viscosity at 25° C. of from 0.05 to 50 Pa·s,
(B) an organosilicon compound containing at least two SiH functions per molecule,
(C) a catalyst of the platinum group, which catalyst can be activated by means of light having a wavelength of from 200 to 500 nm,
(D) a ferrocene compound and
(E) an alkoxysilane having at least one epoxide group is irradiated with light having a wavelength of from 200 to 500 nm.

In a preferred embodiment, the modulus of elasticity of the cured silicone mixture is from 5 to 100 kPa, in particular from 8 to 60 kPa. In this range, the cured silicone mixture generates a sufficient counterpressure against the expansion of a bubble.

All the abovementioned symbols in the abovementioned formulae have their meanings independently of one another in each case. In all formulae, the silicon atom is tetravalent. The sum of all constituents of the silicone mixture is 100% by weight.

Unless indicated otherwise, all amounts and percentages in the following examples are by weight, all pressures are 0.10 MPa (abs.) and all temperatures are 20° C.

EXAMPLES

Description of the raw materials used:

Vinyl polymers (A): These are vinyldimethylsiloxy-terminated dimethylpolysiloxanes prepared by conventional methods.

Vinyl polymer 1: 500 mPas, DP=145
Vinyl polymer 2: 1020 mPas, DP=183
H-terminated polysiloxane (G):
This is an H-dimethylsiloxy-terminated dimethylpolysiloxane having a viscosity of 1000 mPas and a chain length DP=180 which has been prepared by conventional methods.

SiH crosslinker (B):
The SiH-crosslinker is a trimethylsilyl-terminated dimethyl/-methylhydrogen copolysiloxane and has a viscosity of from 100 $mm^2/s$ at 25° C. and an H content of 0.47% by weight.

Catalyst batch (C):
KARSTEDT catalyst (platinum(0)-1,3-divinyl-1,1,3,3-tetramethyldisiloxane complex) containing 1% by weight of platinum in vinylpolymer (A) (1).

Ferrocene (D): Ferrocene 99% from Aldrich.
Alkoxysilane (E): Glycidoxypropyltrimethoxysilane, Dynasilan Glymo from Evonik.

Description of the Silicone Mixtures and Tests:
The silicone mixtures were mixed in suitable mixers. After mixing, the silicone mixtures were degassed at 10 mbar for 10 minutes.

Delamination test, bubble formation test: The degassed silicone mixtures were applied in a layer thickness of 3 mm to a hybrid ceramic which was partly metalized with copper and were cured at 150° C. in a convection oven for 60 minutes. The cast ceramic was subsequently stored on a hotplate having a temperature of 210° C. The evaluation of bubble formation was carried out after 1, 24 and 168 hours.

Positive (pos) means that no bubble formation is observed. Negative (neg) means that bubble formation is observed.

Heat stability test: The degassed silicone mixtures were cured in aluminum dishes in a layer thickness of 6 mm at 150° C. in a convection oven for 60 minutes and subsequently stored hot at 210° C. in a convection oven and samples were taken for measurement after 1, 168 and 1000 hours. Before the modulus measurements, the samples were stored at 20° C. for 4 hours. To determine the modulus, a round cylinder having a diameter of 4 mm was pushed to a depth of 3 mm into the vulcanizate and the force necessary for this was determined. The modulus is calculated from the penetration force per cylinder area of 1256 mm².

In examples 1-6, silicone mixtures were produced, cured and subjected to the tests. The compositions and results are shown in table 1:

Examples 1-3 according to the invention: Silicone mixtures containing heat stabilizer ferrocene and bonding additive Glymo.

Example 4, not according to the invention, without heat stabilizer ferrocene, without bonding additive Glymo, Example 5, not according to the invention, analogous to MX 9702803, with heat stabilizer ferrocene, without bonding additive Glymo Example 6, not according to the invention, without heat stabilizer ferrocene but with bonding additive Glymo.

The examples according to the invention show that only the silicone mixtures of examples 1-3 having the combination of heat stabilizer ferrocene and bonding agent Glymo ensure that thermooxidative embrittlement does not occur and suppresses bubble formation and detachment from the substrate. The silicone mixtures of examples 1-3 give long-term and lasting protection of the substrates to be protected.

TABLE 1

|  |  | Example | | | | | |
|---|---|---|---|---|---|---|---|
|  |  | 1 | 2 | 3 | 4* | 5* | 6* |
| Composition | Vinyl polymer 1: | 100 | — | — | 100 | 100 | 100 |
|  | Vinyl polymer 2: | — | 100 | 100 | — | — | — |
|  | H polymer: | — | 50 | 50 | | | |
|  | SiH crosslinker | 0.8 | 0.2 | 0.8 | 0.8 | 0.8 | 0.8 |
|  | Catalyst batch | 0.1 | 0.1 | 0.1 | 0.1 | 0.1 | 0.1 |
|  | Ferrocene | 0.01 | 0.01 | 0.01 | — | 0.01 | — |
|  | Glymo | 0.5 | 0.5 | 0.5 | — | — | 0.5 |
| Delamination/ | after 1 h/210° C. | pos | pos | pos | neg | neg | pos |
| bubble formation | after 24 h/210° C. | pos | pos | pos | neg | neg | pos |
| positive/negative | after 168 h/210° C. | pos | pos | pos | neg | neg | pos |
| Modulus in kPa | after 1 h/210° C. | 11 | 10 | 48 | 11 | 11 | 10 |
|  | after 168 h/210° C. | 11 | 10 | 48 | >2000 | 11 | >2000 |
|  | after 1000 h/210° C. | 12 | 11 | 48 | >2000 | 12 | >2000 |

*not according to the invention

The invention claimed is:

1. A crosslinkable silicone mixture, comprising
    (A) at least one polyorganosiloxane containing at least two alkenyl groups per molecule and having a viscosity at 25° C. of from 0.05 to 50 Pa·s,
    (B) at least one organosilicon compound containing at least two SiH functions per molecule,
    (C) a catalyst of the platinum group,
    (D) a ferrocene compound and
    (E) an alkoxysilane having at least one epoxide group,
wherein a cured silicone mixture prepared by crosslinking the crosslinkable silicone mixture has a modulus of elasticity of from 5 kPa to 100 kPa.

2. The crosslinkable silicone mixture of claim 1, wherein a polyorganosiloxane (A) containing alkenyl groups corresponds to the average formula (1)

$$R^1_x R^2_y SiO_{(4-x-y)/2} \qquad (1),$$

where $R^1$ is a monovalent, unsubstituted or halogen- or cyano-substituted $C_2$-$C_{10}$-hydrocarbon radical which contains aliphatic carbon-carbon multiple bonds and is optionally bound via an organic divalent group to the silicon atom, $R^2$ is a monovalent, unsubstituted or halogen- or cyano-substituted $C_1$-$C_{10}$-hydrocarbon radical which is free of aliphatic carbon-carbon multiple bonds, x is a nonnegative number such that at least two radicals $R^1$ are present in each molecule and y is a nonnegative number such that (x+y) is in the range from 1.8 to 2.5.

3. The crosslinkable silicone mixture of claim 1, wherein an organosilicon compound (B) containing at least two SiH functions per molecule has a composition of the average formula (4)

$$H_a R^3_b SiO_{(4-a-b)/2} \qquad (4),$$

where $R^3$ is a monovalent, unsubstituted or halogen- or cyano-substituted $C_1$-$C_{18}$-hydrocarbon radical which is free of aliphatic carbon-carbon multiple bonds and a and b are nonnegative integers,
    with the proviso that 0.5<(a+b)<3.0 and 0<a<2 and that at least two silicon-bonded hydrogen atoms are present per molecule.

4. The crosslinkable silicone composition of claim 1, wherein the ferrocene compound (D) is selected from the group consisting of ferrocene, acetylferrocene, vinylferrocene, ethynylferrocene, ferrocenylmethanol, tetrachloroferrate(III), bis(η-cyclopentadienyl)iron(III), tetracarbonyl-bis(η-cyclopentadienyl)diiron(I), 1,1'-bis(trimethylsilyl)ferrocene, 1,1'-(dimethylphenoxysilyl)ferrocene and 1,1'-bis(dimethylethoxysilyl)ferrocene, and mixtures thereof.

5. The crosslinkable silicone composition of claim 1, wherein the silicone mixture has a content of ferrocene compound (D) of 1-5000 ppm by weight.

6. The crosslinkable silicone composition of claim 1, wherein the alkoxysilane (E) having at least one epoxide group has the formula 7

$$R^{13}_u R^{14}_v SiOR^{15})_{4-u-v} \qquad (7),$$

where $R^{13}$ is an unsubstituted or halogen-substituted monovalent hydrocarbon radical having from 1 to 10 carbon atoms,
$R^{14}$ is a monovalent hydrocarbon radical which contains at least one epoxy group and has from 2 to 20 carbon atoms and which is optionally halogen-substituted and optionally interrupted by O, N, S or P atoms,
$R^{15}$ is an alkyl radical having 1-6 carbon atoms,
u is 0, 1 or 2 and
v is 1, 2 or 3,
  with the proviso that the sum of u and v is less than or equal to 3.

7. The crosslinkable silicone mixture of claim 1, wherein the silicone mixture has a content of compound (E) of 0.01-5% by weight.

8. A silicone molding obtained by a process in which a silicone mixture of claim 1 is heated to at least 80° C.

9. A silicone molding obtained by a process in which a silicone mixture of claim 1, containing a catalyst of the platinum group which is activatable by light having a wavelength of from 200 to 500 nm, is irradiated with light having a wavelength of from 200 to 500 nm.

* * * * *